ion is utilized to suspend carbon nanotubes in a nonpolar
United States Patent Sutto et al.

(10) Patent No.: US 7,781,635 B1
(45) Date of Patent: Aug. 24, 2010

(54) SURFACTANT-BASED PURIFICATION OF NANOTUBES

(75) Inventors: Thomas E. Sutto, Fredericksburg, VA (US); Karen A. McGrady, Fredericksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 618 days.

(21) Appl. No.: 11/500,090

(22) Filed: Aug. 7, 2006

(51) Int. Cl.
*C07C 7/10* (2006.01)
*C01B 31/02* (2006.01)
*D01F 9/12* (2006.01)

(52) U.S. Cl. .................... 585/836; 423/461; 423/447.2; 585/800; 585/833; 585/839; 977/750

(58) Field of Classification Search .................. 423/461, 423/447.1, 447.2, 447.3; 585/800, 833, 836, 585/839
See application file for complete search history.

(56) References Cited

U.S. PATENT DOCUMENTS

| 5,494,558 | A | 2/1996 | Bunshah et al. | |
|---|---|---|---|---|
| 5,560,898 | A | 10/1996 | Uchida et al. | |
| 5,698,175 | A | 12/1997 | Hiura et al. | |
| 6,303,094 | B1 | 10/2001 | Kusunoki et al. | |
| 6,422,450 | B1 | 7/2002 | Zhou et al. | |
| 6,451,175 | B1 | 9/2002 | Lal | |
| 6,559,550 | B2 | 5/2003 | Herman | |
| 6,582,673 | B1 | 6/2003 | Chow et al. | |
| 7,074,980 | B2 * | 7/2006 | Prato et al. | 585/839 |
| 2002/0189444 | A1 * | 12/2002 | Brennecke et al. | 95/45 |
| 2004/0077519 | A1 * | 4/2004 | Price et al. | 510/499 |

\* cited by examiner

*Primary Examiner*—Jerry Lorengo
*Assistant Examiner*—Joseph V Micali
(74) *Attorney, Agent, or Firm*—Oscar A. Towler, II; Gerhard W. Thielman, Esq.

(57) ABSTRACT

A mixture and method of using such mixture is provided for purifying carbon nanotubes. A substituted imidazolium cation is utilized to suspend carbon nanotubes in a nonpolar liquid. A polar solvent immiscible with the nonpolar liquid is mixed in to remove soot from the suspension, allowing recovery of the nanotubes. The relative gentleness of the separation provides nanotubes that are undamaged and unoxidized. The components of the mixture are economically advantageous for this use and the method is simple compared to other nanotube purification methods.

10 Claims, No Drawings

SURFACTANT-BASED PURIFICATION OF NANOTUBES

STATEMENT OF GOVERNMENT INTEREST

The invention described herein was made in the performance of official duties by one or more employees of the Department of the Navy and therefore the invention disclosed herein may be manufactured, used, or licensed by or for the Government of the United States for governmental purposes without the payment of any royalties thereon or therefor.

BACKGROUND

Carbon nanotubes, once the objects only of research and characterization, are finding increasing usefulness in a variety of applications. They are being employed, for example, as components of fibers for inclusion in weaving rugs that will then have antistatic properties, as components of moldable resins, and as components of films used as static-free packaging for electronics. See, e.g., U.S. Pat. No. 6,426,134. Carbon nanotubes have also been taught as being useful in the piezoelectric generation of electrical energy, according to U.S. Pat. No. 6,559,550. Carbon nanotubes are used as absorbents or as the tips of probes used in various scanning microscopes, and many additional uses are known and being found.

There are several methods of creating carbon nanotubes. A common method is arcing or sputtering. A current is passed between two separated electrodes, either or both of which are graphite or another carbon compound. What is formed is a mass, sometimes called a boule, of carbon material. Some of the mass consists of the carbon nanotubes, while the remainder consists of amorphous carbon, other fullerenes, graphite, and the like.

Other methods of producing carbon nanotubes have been proposed. Laser ablation of a carbon surface is one and catalytic vapor deposition is another. It has also been proposed to create nanotubes by heating a SiC crystal under a vacuum, whereby the silicon atoms are removed from the crystal leaving behind oriented carbon nanotubes.

While some of these methods, such as that disclosed in U.S. Pat. No. 6,303,094 relating to the above-referenced SiC crystal method, are said to produce very high purity nanotubes, most methods do not. The process of forming the carbon nanotubes almost invariably results in the formation of the other carbon substances such as amorphous carbon and, depending on the process, other carbon or non-carbon substances may be mixed in with the carbon nanotubes. For the purposes of this application, all substances, whether carbon or carbon compounds or non-carbon materials, other than the nanotubes themselves, are referred to herein as "soot."

A problem to be addressed before the nanotubes can be utilized, then, is separating the nanotubes from the soot or, put another way, to purify the nanotubes. A method of purification mentioned in U.S. Pat. No. 6,422,450 is to suspend an as-produced mixture of nanotubes and soot in an alcohol by subjecting the mixture to a high-power ultrasonic horn, and then filtering the suspension through a micro-port membrane. It is disclosed that the use of the horn may serve to damage or create defects in the nanotubes. Another method, mentioned in U.S. Pat. No. 6,426,134, requires refluxing impure nanotubes in 2.6 M nitric acid, then resuspending the mixture in pH 10 water with a surfactant such as sodium lauryl sulfate, followed by filtration in a cross-flow filtration system and filtration through a polytetrafluoroethylene filter.

The first method cited above requires the use of special equipment, and damages the nanotubes by removing the ends and creating other defects. The second method requires the use of harsh reactants, which may also damage the nanotubes, and requires several steps. In addition, this second method results in the oxidation of at least the ends of the nanotubes.

For many purposes in both research and commercial applications it is desired to have a plentiful source of undamaged nanotubes. Such nanotubes are sometimes referred to as native state nanotubes because, other than the purification, they have not been chemically or mechanically altered after being created by whatever method was utilized to create the nanotubes. Such native state nanotubes may have, whether by intent or not, certain defects in structure. The nanotubes may also, again whether by intent or not, chemically or mechanically contain atoms or molecules other than carbon. In any case, what is needed in the art is a simple method of purifying carbon nanotubes without damaging the nanotubes and without using reagents that are harmful to the nanotubes, the person practicing the method, or the environment.

SUMMARY OF THE INVENTION

The relatively gentle purification of nanotubes is made possible through the use of the cation disclosed herein, and the method of using that cation. The cation, alone or as a component of an ionic liquid, is mixed into a nonpolar liquid, to which solution is added unrefined nanotubes, that is, soot containing the nanotubes. This mixture is then stirred until at least the nanotubes are suspended therein. The nonpolar liquid bearing the nanotubes is brought into contact with a polar liquid that is substantially immiscible with the nonpolar liquid.

It has been found that, while the nanotubes will stay suspended in the nonpolar liquid by virtue of the action of the cation, substantially all of the soot will become suspended or dissolved in the polar solvent. Conventional separation of the two immiscible solvents, e.g., by decanting, effects separation, that is, purification, of the nanotubes from the soot. The nanotubes may be further refined, if necessary, by repeating the foregoing. The nanotubes can be recovered from the non-polar solvent by any convenient method depending on the nature of the solvent. Many nonpolar solvents can simply be evaporated while others can be subjected to microfiltration techniques to recover the nanotubes.

DETAILED DESCRIPTION

As set forth above, known techniques for separating or purifying nanotubes involve harsh and/or expensive reagents, harsh physical conditions, or both. Indeed, some techniques specifically are designed to physically alter the nanotubes, e.g., to remove the endcaps, or to chemically alter them, e.g., by attaching functional groups such as oxygen or nitrogen compounds. Treatment by these methods fragments the nanotubes, leaving them physically shorter than the originals. The damage also results in leaving nanotubes structures that provide poorer electrical conduction and lower thermal and electrochemical stability.

Certain applications, however, require high-purity relatively undamaged nanotubes. (References to "nanotubes" herein include either or both single-wall or multiple-wall nanotubes.) Such applications include using nanotubes to provide, enhance, or otherwise alter electrical conductivity. These applications often include conditions requiring thermal stability, electrochemical stability, or both, which conditions are enhanced or achieved through the use of native state nanotubes, that is, nanotubes that have been physically or chemically altered not at all, preferably, but at least as little as possible. To obtain such undamaged nanotubes, the separation or purification process must be gentle. Also, as with any process, it is desired to make the process simple and highly efficient, while avoiding the use of costly reagents and equipment. Additionally, where reagents are used, it is desired to use reagents that require the fewest and least expensive safety measures.

Finding methods for obtaining high-purity undamaged nanotubes for such uses has been, however, problematic. While alternative methods of creating nanotubes are being sought, the most common remains that of creating an electrical arc between two electrodes, at least one of which is graphite. The resultant mixture, or boule as it has been called, is usually no more than thirty percent (30%) by weight carbon nanotubes, the remainder being other forms of carbon, whether useful in other applications or not, such as amorphous carbon, graphite, other types of fullerenes and the like. This remainder is referred to herein as "soot."

Complicating the purification of the nanotubes is the fact that the nanotubes have a strong tendency to form clumps. This is due in part, at least initially, simply by the process of creating them. It is also due, however, to the strong van der Waals forces generated by the nanotubes and soot. These forces have a relatively strong effect on other nanotubes, which is likely due to the pure or nearly pure monomolecular nature of the nanotubes and the very high length to thickness ratios thereof. The clumping of the nanotubes traps soot, making it extremely difficult and wasteful to simply "wash" the soot away from the nanotubes. Attempts at filtration will also be wasteful because either smaller clumps and single nanotubes are lost in retaining the larger clumps, or larger clumps are considered waste while attention is focussed on recovering small clumps and or single nanotubes.

The current invention makes possible the relatively gentle and efficient purification of nanotubes, and does so through the use of relatively inexpensive reagents. Moreover, use of the cation and method of the current invention enables the recovery of a very high percentage of the nanotubes in the boule.

The current invention involves the discovery and use as a surfactant-type reagent a substituted imidazolium cation. This cation is

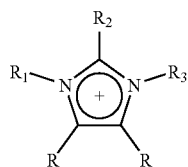

wherein each R independently is H or a halogen; $R_1$ and $R_2$ independently are H, a halogen, or $CH_3$; and $R_3$ is an aliphatic moiety of formula $C_nA_m$ with $n \geq 1$ and $m \geq n$, and where each A independently is H or a halogen, and wherein "halogen" as used throughout includes any of the Group 17 (IUPAC designation) elements.

This cation makes possible a simple and highly efficient method of purifying nanotubes from soot. The cation, either as a cationic constituent of an ionic liquid or as a halide salt, is mixed with a selected nonpolar liquid or solvent. To this mixture, referred to sometimes herein as a purifying phase, is added the boule, or nanotubes and soot mixture, to be purified. The purifying phase and boule are stirred until such time as substantially all of the nanotubes and soot are suspended in the phase. The stirring can be accomplished gently by mechanical means such as a magnetic stirrer or by agitation. Whether the nanotubes and/or the soot are actually dissolved in the purifying phase, or are suspended as particles, or even whether some other mechanism or combination of mechanisms is operative is not precisely known; and as used herein, "dissolved" and "suspended" (and the respective other word forms thereof) are used interchangeably to describe this result. The inventors hereof, not intending to be bound or limited by a theory, believe that the cation described herein acts as follows. The described imidazolium ion is highly planar, presenting a very "graphite-like" surface that is physically complementary to the surface of the nanotubes. At the same time, the imidazolium of course is charged, which further attracts the nanotubes while simultaneously damping the van der Walls forces. This allows the nanotubes to separate from the clumps and be suspended, while the soot is likewise separated Whatever mechanism is actually operative, it has been found that stirring the boule in the nonpolar solvent with the imidazolium cation will suspend the soot and the nanotubes in the purifying phase.

Once the nanotubes are suspended in the purifying phase, the nanotubes can be separated from the soot. The nonpolar purifying phase is brought into contact with a polar solvent selected to be substantially immiscible with the nonpolar solvent of the purifying phase. Upon such contact, substantially all of the soot migrates to the polar solvent. The polar and nonpolar phases are allowed to separate after which one or the other can be removed, e.g., by decantation.

Once the phases have been separated, the nanotubes can be recovered from the purifying phase by any number of known methods or combinations thereof. A purifying phase consisting of a relatively volatile solvent can be evaporated (and recovered for re-use by a conventional condenser), leaving the nanotubes to be washed or further processed. The nanotubes can also be removed from solution by filtration. This separation or purification technique can be repeated if desired, although the inventors hereof have achieved recovery of over ninety percent (90%) by weight of purified nanotubes using only a single separation procedure as described herein.

The selected cation and the process described above provide great flexibility in designing the overall system for purification. The substituent moieties on the imidazolium cation can be selected based on several criteria as known to those of skill in the art. The cation, for example, can be made relatively more or less hydrophobic through appropriate selection of the moieties. The length of the aliphatic "tail" that is $R_3$ on the cation can also be selected depending on which polar and nonpolar solvents are to be used and other known factors. For use in purifying nanotubes as described herein, it is preferred that n be between four (4) and twenty (20) inclusive, and it is most preferred that n be equal to 16. In its most preferred form, the cation is such that n=16 and $R_1=R_2=CH_3$. Also, it is preferred that the cation be present in the nonpolar solvent in amounts ranging from about 0.10 moles/liter to about 0.35 moles/liter.

The polar and nonpolar solvents can be chosen according to a number of variables with which those of skill in the art will be familiar. The nonpolar solvent must be capable of being mixed with the imidazolium cation, and otherwise can be selected on the basis of safety, cost, availability, recyclability, and similar factors. The polar solvent likewise can be selected, on the basis of safety, cost, and other factors. It must be selected such that even when being contacted with the nonpolar solvent, which will contain the cation, the nanotubes, and the soot, it will remain substantially immiscible with the nonpolar solvent such that the two can be separated.

Giving regard to the foregoing, any number of immiscible polar and nonpolar solvents can be selected. Preferred solvents are dichloromethane, chloroform, and other volatile aliphatic organic liquids as the nonpolar solvent; and water or ethanol as the polar solvent. The most preferred solvent pair for purifying nanotubes effectively and safely is methylene chloride and water. Both of these solvents are cost-effective and relatively safe, requiring only normal precautions in use.

As stated above, the imidazolium cation can be combined with the nonpolar solvent as a halogen salt, in which case the preferred halides include the fluoride, chloride, bromide, and iodide anions. Other anions can be selected, again with regard to the solvents being used, among which are the following preferred anions: $BF_4^-$, $PF_6^-$, $CN^-$, $SCN^-$, bis-trifluoromethanesulfonyl imide $\{N(SO_2CF_3)_2\}^-$, bis-perfluoroethanesulfonyl imide $\{N(SO_2C_2F_5)_2\}^-$, and $L_tX_u$ where L is a multi-valent ion coordinated by X, and t and u are balanced in such a way as to give the complex an overall negative charge.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method for producing purified nanotubes, said method comprising the steps:
    (a) providing unrefined nanotubes;
    (b) providing a nonpolar solvent;
    (c) mixing into said nonpolar solvent a cation to form a purifying phase, said cation having the formula:

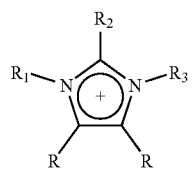

wherein each R independently is H or a halogen; $R_1$ and $R_2$ independently are H, a halogen, or $CH_3$; and $R_3$ is an aliphatic moiety of formula $C_nA_m$ with $n \geq 1$ and $m \geq n$, and where each A independently is H or a halogen;
    (d) mixing into said purifying phase said unrefined nanotubes;
    (e) combining with said purifying phase and said unrefined nanotubes a polar solvent, said polar solvent being substantially immiscible with said nonpolar solvent;
    (f) allowing said purifying phase and said polar solvent to substantially separate, whereby purified nanotubes remain suspended in said purifying phase; and
    (g) extracting said purified nanotubes from said purifying phase.

2. The method according to claim 1, wherein in $R_3$ n has a range of 4-20.

3. The method according to claim 1, wherein in $R_3$ n is equal to 16.

4. The method according to claim 1, wherein said cation is added to said nonpolar solvent in a concentration ranging from 0.10 moles/liter to 0.35 moles/liter.

5. The method according to claim 1 wherein said cation is added to said nonpolar solvent as an ionic liquid, said ionic liquid further comprising an anion.

6. The method according to claim 5, wherein said anion is selected from the group consisting of $BF_4^-$, $PF_6^-$, halogen anions, $SCN^-$, bis-trifluoromethanesulfonyl imide anion, bis-perfluoroethanesulfonyl imide anion, and $L_tX_u$ where L is a multi-valent ion coordinated by X and t and u are selected such that the complex is an anion.

7. The method according to claim 5 wherein said anion is present in said ionic liquid in an amount sufficient to render said ionic liquid substantially electrically neutral.

8. The method according to claim 1 wherein $R_1$ and $R_2$ are both $CH_3$ and n is 16.

9. The method according to claim 8 wherein the nonpolar solvent is methylene chloride and the polar solvent is water.

10. A method of extracting substantially native state carbon nanotubes from soot containing said nanotubes, said method comprising:
    (a) suspending said soot containing said nanotubes in a liquid nonpolar phase, said nonpolar phase comprising a nonpolar solvent and a cation having the formula

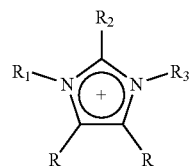

wherein each R independently is H or a halogen; $R_1$ and $R_2$ independently are H, a halogen, or $CH_3$; and $R_3$ is an aliphatic moiety of formula $C_nA_m$ with $n \geq 1$ and $m \geq n$, and where each A independently is H or a halogen;
    (b) mixing said nonpolar phase with a polar liquid, said polar liquid selected such that it is substantially immiscible with said nonpolar solvent, for a period of time sufficient to suspend substantially all of said soot in said polar liquid; and
extracting said native state nanotubes from said nonpolar phase.

* * * * *